No. 783,677. PATENTED FEB. 28, 1905.
A. A. CAILLE.
STRIKING MECHANISM.
APPLICATION FILED JAN. 30, 1904.
3 SHEETS—SHEET 1.
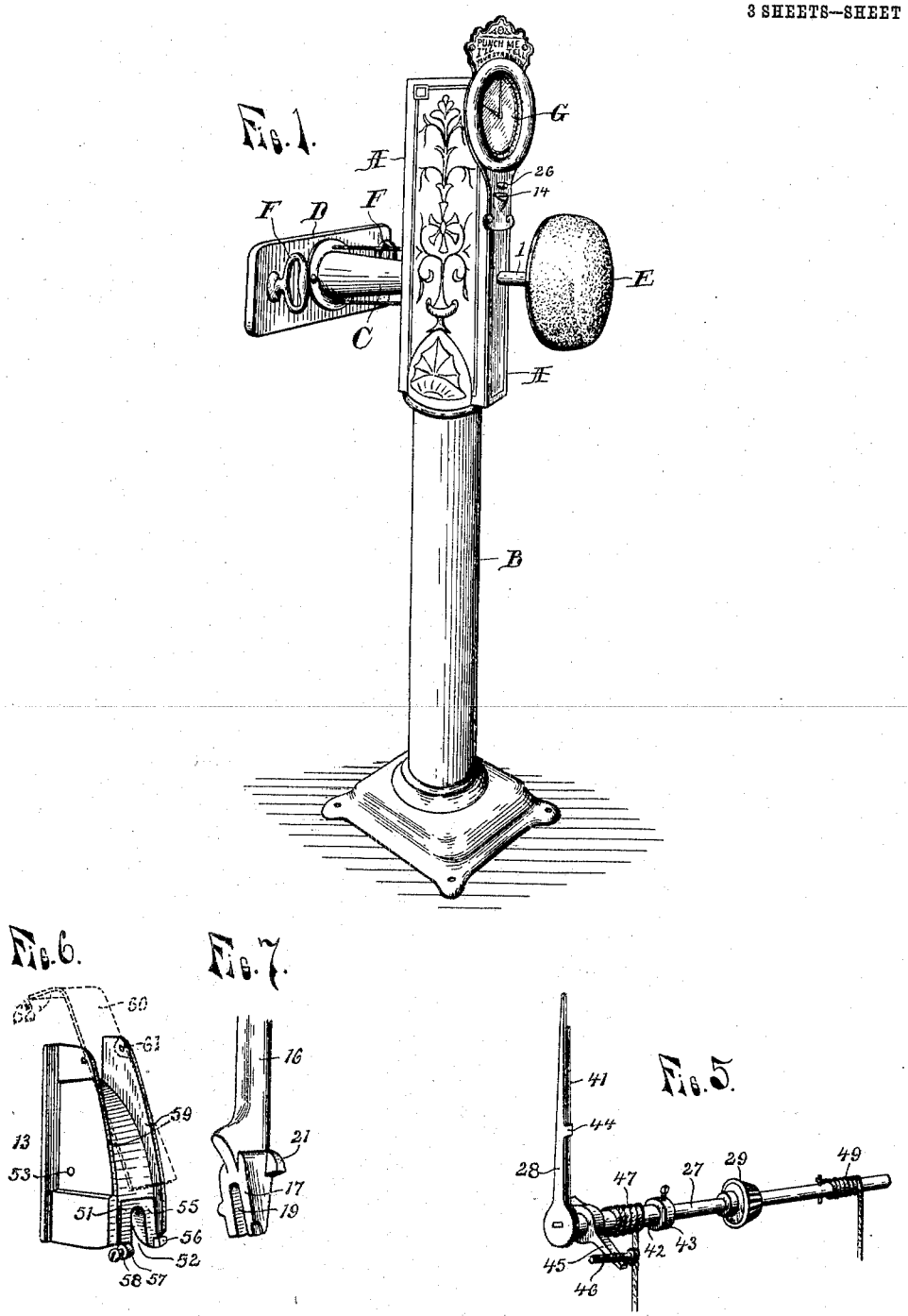

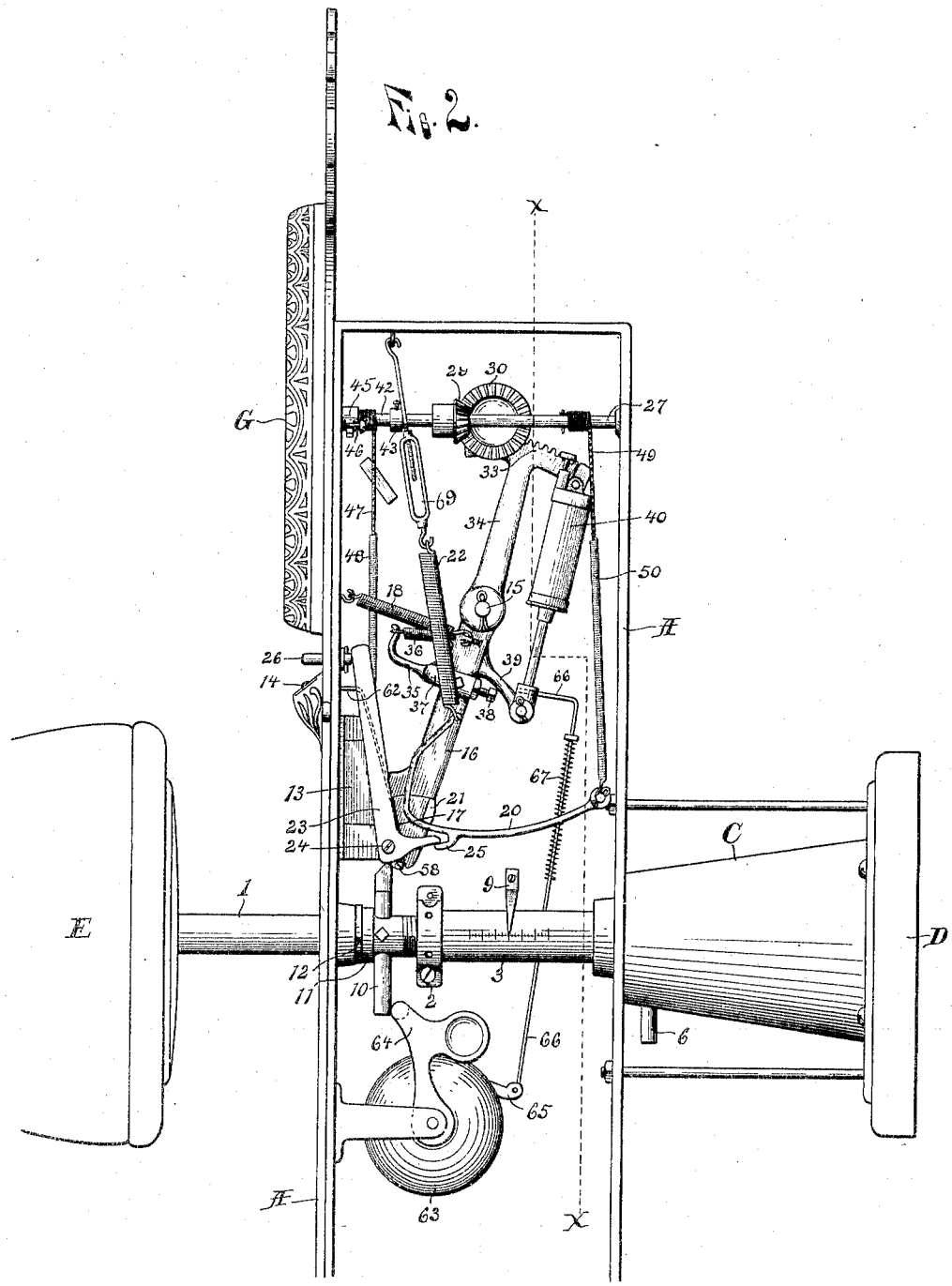

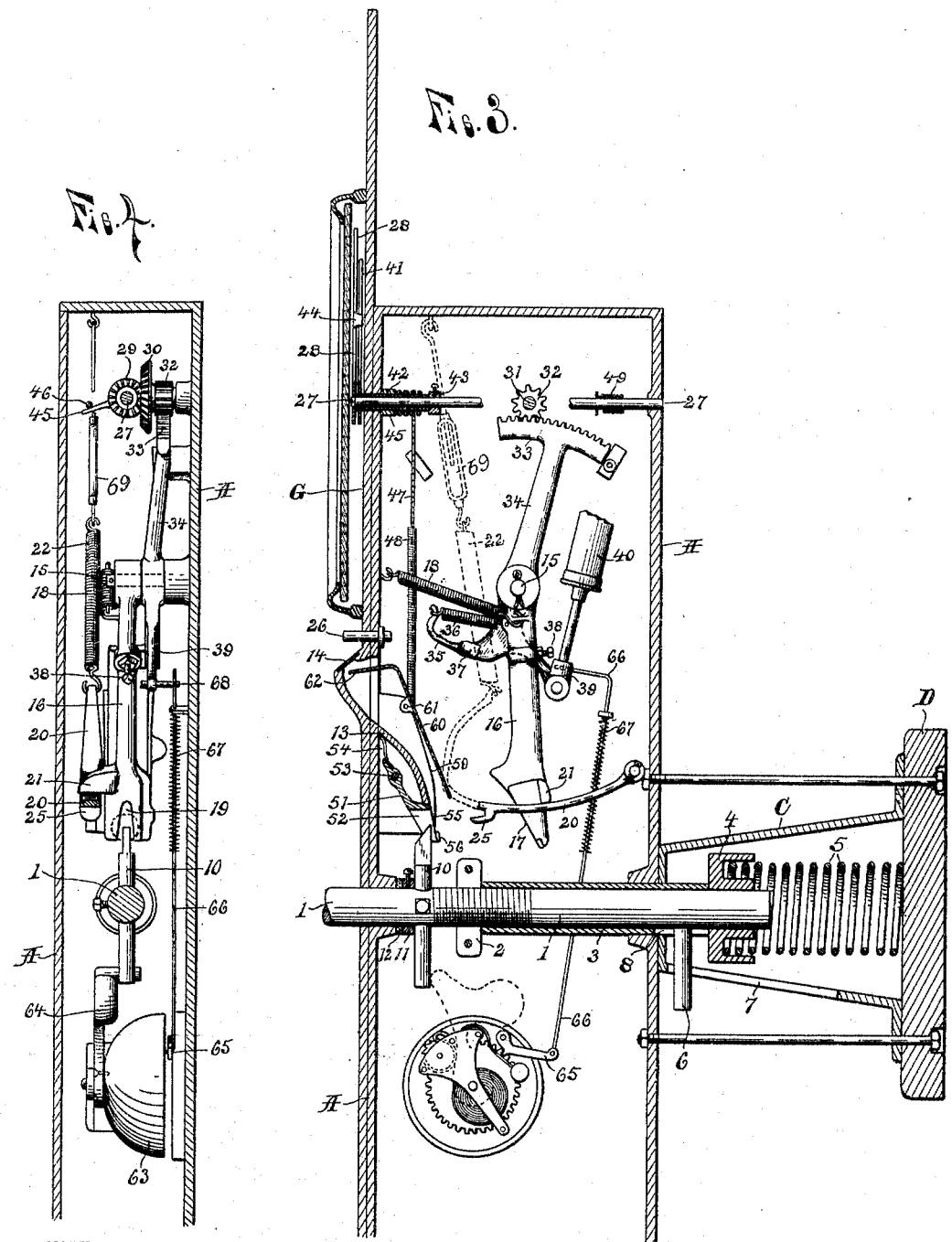

No. 783,677. Patented February 28, 1905.

UNITED STATES PATENT OFFICE.

AUGUSTE ARTHUR CAILLE, OF DETROIT, MICHIGAN.

STRIKING MECHANISM.

SPECIFICATION forming part of Letters Patent No. 783,677, dated February 28, 1905.

Application filed January 30, 1904. Serial No. 191,257.

*To all whom it may concern:*

Be it known that I, AUGUSTE ARTHUR CAILLE, a citizen of the United States of America, residing at Detroit, in the county of Wayne and State of Michigan, have invented certain new and useful Improvements in Striking Mechanism, of which the following is a specification, reference being had therein to the accompanying drawings.

This invention relates to improvements in striking-machines for testing the strength of a person in delivering a blow with the fist; and its object is to provide a very strong, simple, cheap, and compact device for the purpose, provided with indicating mechanism and with adjusting means whereby the relation of the indicated to the real force of the blow may be changed.

A further object of the invention is to so construct the device that the shock of the blow will not be transmitted to the indicating means and to provide means for controlling the operation of said means by a coin.

It is also an object of the invention to provide certain other new and useful features, all as hereinafter more fully described, reference being had to the accompanying drawings, in which—

Figure 1 is a perspective view of a device embodying the invention; Fig. 2, an enlarged side elevation of the same with one side of the casing removed; Fig. 3, a central vertical section; Fig. 4, a section on the line $x$ $x$ of Fig. 2. Fig. 5 is a detail showing the indicating-hands and part of the operating mechanism therefor in perspective; Fig. 6, a detail showing the coin-chute in perspective, and Fig. 7 a detail perspective view of the forked lower end of the operating-arm for actuating the indicating mechanism.

A is a casing secured to the upper end of a standard or pedestal B.

C is a spring-casing extending from the rear side of the casing A, and D is a backing-board secured transversely to the end of the spring-casing and adapted to be secured to a wall or other support to hold the device in place and take the force of the blows delivered upon the pad or buffer-head E at the opposite or front side of the casing A.

F represents handles secured to the board D, one at each side of the machine, so that, if desired, the operator may test his strength by placing his chest against the buffer E and, grasping the handles, force inward on said buffer.

G is a suitable dial at the front of the casing above the buffer to indicate the force of the blow or the pressure applied to the buffer.

1 is a longitudinally-movable non-rotative shaft extending tranversely through the casing A into the longitudinal axis of the spring-casing C and outward from the front side of the casing. To this forwardly-extending end of said shaft is secured the buffer E, and intermediate its ends the shaft is screw-threaded and provided with an internally-screw-threaded clamping-collar 2, made in halves bolted together to clamp the shaft, so that said collar will not turn thereon after it has been adjusted to any particular position. Abutting at one end against this collar is a tubular sleeve 3 on the shaft, and at its opposite end this sleeve engages a socket member 4, loosely mounted on the shaft to receive one end of a heavy coiled spring 5, the opposite end of said spring engaging the board D to form the resistance to the longitudinal inward movement of the shaft. Secured in an opening in the shaft is a guide-pin 6, which projects downwardly through a slot 7 in the bottom of the spring-casing C to limit the movement of said shaft and prevent its rotation, and the sleeve 3 is slotted inward from one end at 8 to allow the pin to project through. The tension of the spring 5 may thus be adjusted by turning the collar 2, as the sleeve 3 will be moved longitudinally on the shaft by said collar and move the socket member 4 thereon to further compress or let out on the spring. The sleeve 3 is provided with graduation-marks on one side, and secured to the casing is a pointer 9 to indicate the amount of tension which has been put upon the spring, the graduations being marked to indicate the point where the sleeve must be set to put such a tension upon the spring that the number of pounds indicated by the dial G will correspond with the actual force of the blow. Extending through a transverse opening in the shaft is a verticallyextending operating-pin 10, adjustably held therein by a set-screw, and on the shaft between said pin and the end of the bearing for the shaft in the forward side of the casing is a collar 11, secured to the shaft to engage a washer 12, of leather or other suitable material, to take the force of the return movement of the shaft.

Secured to the forward edge of the casing is a coin-chute 13, communicating with an opening or slot 14 in said edge, and pivoted upon a stud 15, extending from the side of the casing, is the operating-lever 16, formed at its lower end with a beveled side 17 to engage the coin-chute near its lower end, said lever being normally held against the chute by a spring 18, attached at one end to the forward edge of the casing and at its opposite end to an ear on said lever. The lower end of the lever 16 is forked at 19, so that when there is no coin between it and the coin-chute, which is also forked at its lower end, the upper end of the operating-pin 10 will pass through these forks and the lever will not be actuated by said pin; but when a coin is placed between and the shaft forced inward said pin 10 will engage the coin lying across the fork of said lever, and the lever will be swung on its pivot. To hold the operating-lever in the extreme position to which it is turned by the movement of the operating-pin, a curved brake-bar 20 is pivoted near the rear of the casing and is held in frictional contact with a lug 21 on the side of the lever by a coiled spring 22, attached to the opposite end of said bar, the opposite end of which spring is attached to the casing by an adjusting-turnbuckle 69, and to release said lever, so that it may be returned to its normal position by the spring 18, a bell-crank lever 23, pivoted at 24, is provided, having its short arm in engagement with a hook 25 on the brake-bar and operated to force the brake downward against the action of the spring 22 by a push-pin 26, engaging the upper end of its long arm and extending through the front of the casing above the coin-slot.

Mounted in bearings in the casing, with its forward end projecting a short distance through the axis of the dial G, is a small shaft or rod 27, to the extreme projecting end of which a hand or pointer 28 is secured, and on said shaft intermediate its ends is secured a bevel-gear 29, in mesh with a bevel-gear 30, mounted on a stud or stub-shaft 31, projecting inward from the side of the casing. A pinion 32 is also mounted on said stub-shaft 31 to turn the gear 30, and to actuate said pinion a gear-segment 33, formed integral with the end of an arm 34, pivoted at its opposite end upon the stud 15, is provided. This segment is actuated by the operating-lever 16 by providing a spring connection between the two, said segment-arm 34 being provided with a downwardly and laterally extending arm 35 at the opposite side of its pivot, to which arm is attached one end of a coiled spring 36, the opposite end of said spring being attached to the operating-lever. The arm 35 is provided with a stop 37, with which the operating-lever is normally held in contact by the spring 36, and a set-screw 38 extends through said lever to engage the stop, so that the relative normal positions of said lever and segment may be adjusted. A second arm 39 on the segment extends in an opposite direction to the arm 35, and to its end is pivotally attached the piston-rod of an air-compression cylinder 40, which cylinder is pivotally attached at its upper end to a stud on the casing. When a coin is inserted in the chute and a blow delivered upon the buffer-head, the operating-lever will be very suddenly swung on its pivot, and a sudden shock of this movement is prevented from being transmitted to the indicating-hands and means for operating the same by the spring connection between said operating-arm and segment, as said spring 36 will first yield without moving the segment, as shown in Fig. 3, and will thus gradually operate to turn the segment against the resistance of the air-compression cylinder.

While only one row of division-marks on the dial and one hand may be employed, it is preferable to provide two rows and a hand for each row, as it will not be necessary in order to give the machine the proper range to make the division so small, and therefore a short hand 41 is provided. This short hand is secured to the end of a sleeve 42 on the shaft 27 and lies between the hand 28 and the dial-face, said sleeve being prevented from longitudinal movement on the shaft by the hand 28 engaging one end and a collar 43 at the opposite end. Integral with the forward or right-hand edge of the hand 28 is a lip 44, extending inward toward the dial to engage and move the hand 41, and secured to the sleeve 42 adjacent to the wall of the casing is an arm 45 to engage a stop 46 on said wall and limit the movement of the hands. A cable 47 is secured at one end to said sleeve and given several turns around the same in such a direction that a coiled spring 48, attached to its opposite end, will exert a force to hold the arm 45 against its stop.

The parts are so arranged that when the rack is operated by the lever 16 the shaft 27 will be turned by the gearing and move the hand 28 to the right, the hand 41 being stationarily held by the spring 48 until the hand 28 makes one revolution and the lip 44 comes in contact with the hand 41, when said hand will be carried forward by the hand 28 against the action of said spring 48. The lever 16 being held by the brake 20 in the position to which it is turned, the hands are also held in the position to which they are turned thereby, and when the brake is released the hand 28 will be turned backward by the rack, the hand 41 being turned backward by the spring 48 until the arm 45 engages its stop. This retrograde movement of the hands is retarded, so that the force of the movement will be lessened, by securing one end of a cable 49 to the shaft, around which it is given several turns, and securing a coiled spring 50 to its opposite end, and the backward movement of the rack is retarded by the action of the cylinder 40.

If for any reason the shaft 1 should not be fully returned by its spring, so that the operating-pin is not passed through the forked ends past the face of the chute to engage the coin when the shaft is again forced inward, and a coin should be dropped in, so that the pin would engage it upon the return or outward movement of the shaft, the coin would receive the force of the spring and be bent or wedged into the lower end of the chute, thus causing trouble and perhaps breaking the parts. To provide for this contingency, the bottom of the chute is cut away at its lower end, and a movable member 51, which is slotted or forked at 52 to allow the operating-pin 10 to pass, is pivoted at 53 beneath the bottom of the chute and held by a spring 54 with its face 55 in line with said bottom. At the extreme lower end of the member 51, at one side of its fork, is a slight projection or lug 56, and at the opposite side of the fork is an ear 57, provided with a screw-threaded opening to receive a screw 58, adapted to be adjusted toward or from the lug to increase or diminish the distance between, according to the size of the coins to be used in operating the machine. The side portions 59 of the chute project slightly above its bottom at the lower end, and the forked lower end of the operating-lever 16 engages these sides when in its normal position or inoperative and forms the fourth side of the lower end of the chute. Therefore when a coin is inserted through the slot 14 it will pass down the chute and be supported by the lug 56 and screw 58, across the forks of the movable member and operating-lever, and between their adjacent faces 55 and 17, respectively.

To prevent a coin from being put into the chute before the push-pin has been operated to release the operating-lever and return it to position against the chute, a sheet-metal strip 60, which extends across and forms the top of the chute, is pivoted to the sides of the chute at 61 and extends downward to near the lower end thereof, where it will be engaged by the operating-lever when said lever moves into engagement with the chute and rock said strip on its pivot to move the upper end 62 from across the slot 14, said end being bent to project outward adjacent to said slot.

Secured to the side of the casing below the shaft 1 is a spring-operated bell 63 of the ordinary construction, in which the spring is wound by turning the bell, and to so turn the bell a weighted lever 64 is secured to the bell and extends upward into engagement with the downwardly-projecting end of the operating-lever 10, so that when the shaft 1 is forced inward the lever 64 will be turned and the spring be wound. A pawl 65 engages a gear on the bell and holds the spring from operating to ring the bell, and a rod 66, provided with a coiled spring 67, sleeved thereon to hold the pawl in engagement with the gear, is attached at one end to the pawl and having its upper end bent at right angles to engage a laterally-extending pin 68 on the arm 39. When the segment 33 has moved a certain distance and the hands have been turned to a predetermined point, the pin 68 will engage the rod 66 and release the pawl, allowing the bell to ring.

Having thus fully described my invention, what I claim is—

1. In a striking-machine, the combination of a longitudinally-movable shaft, a buffer on one end of said shaft, a coiled spring to resist the longitudinal movement of the shaft, a sleeve on said shaft to engage the end of the spring and provided with graduation-marks, an adjustable collar on said shaft to engage the opposite end of said sleeve and adjust the same longitudinally on the shaft, and a fixed pointer opposite said graduation.

2. In a striking-machine, the combination with a casing, of a longitudinally-movable shaft mounted in bearings on the casing with its ends projecting through the sides of the casing and screw-threaded intermediate its ends, a buffer secured to the forward end of the shaft, a spring-casing having a longitudinal slot in its bottom secured to the rear of the other casing with the rear end of the shaft projecting within the axis of the same, a socket member loosely mounted on said shaft within the spring-casing, a coiled spring engaging said socket at one end and the spring-casing at its opposite end, a sleeve on said shaft, an internally-screw-threaded clamping-collar engaging the screw-threaded portion of the shaft and made in halves to clamp the same, and a guide-pin secured in an opening in the shaft and engaging the slot in the spring-casing.

3. In a striking-machine, the combination with a movable member actuated by the blow, of a second movable member adapted to be actuated by the first movable member, indicating mechanism, an arm for actuating the indicating mechanism, and a spring connecting the second movable member and said arm to operate the latter when the former is moved by the first movable member.

4. In a striking-machine, the combination with a longitudinally-movable member actuated by the blow, of an operating-lever adapted to be moved in one direction by said member, a spring to move the same in the opposite direction, indicating mechanism, a pivoted arm to actuate said mechanism, and a spring to yieldingly connect said arm and lever.

5. In a striking-machine, the combination with a longitudinally-movable member, of an operating-lever adapted to be moved by said member, indicating mechanism, an arm to operate said mechanism, a spring connecting said arm and lever, and an air-compression cylinder having its piston-rod pivotally attached to said arm to retard the movement thereof.

6. In a machine of the character described, in combination with a movable member thereof, of an indicating-dial, an indicating-hand, means actuated by the movement of said movable member for turning said hand, a second indicating-hand, a lip on the first hand normally projecting into the path of the second hand at the forward edge thereof and adapted to engage its rear edge to turn the same, and means for turning the second hand backward.

7. In a machine of the character described, the combination with a movable member thereof, of an indicating-dial, a shaft in the axis of said dial, an indicating-hand secured on the end of said shaft and turned thereby, a sleeve on said shaft, a second indicating-hand secured on said sleeve adjacent to the first hand, a lip on the first hand to normally engage the forward edge of the second hand and adapted to engage the rear edge of said second hand to move the same upon one revolution of the first hand, means for turning the second hand backward, a stop to limit the movement of the second hand, and means actuated by the movement of the said movable member for turning the shaft to turn the first hand.

8. In a machine of the character described, the combination with a movable member thereof, of an indicating-dial, a shaft projecting at one end into the axis of said dial, an indicating-hand secured on the end of said shaft, a sleeve on the shaft, a second indicating-hand secured on said sleeve, a lip on the first hand projecting into the path of the second hand, an arm secured to said sleeve, a stop to engage said arm, a spring to normally hold the arm against said stop, a bevel-gear on the shaft, a stub-shaft, a bevel-gear on the stub-shaft to transmit motion to the gear on the shaft, a pinion on the stub-shaft, a gear-segment engaging said pinion, and means for transmitting motion from the said movable member to actuate said segment.

9. In a striking-machine, the combination with a movable member adapted to be actuated by a blow and indicating means operated by the movement of said member, of a bell, a spring to automatically operate said bell, means for winding said spring by the movement of said movable member, a pawl to prevent the spring from unwinding, and a rod engaging said pawl to release the same and adapted to be operated by the indicating mechanism when a certain predetermined point is indicated.

10. In a striking-machine, the combination with a movable member adapted to be actuated by a blow, of a second movable member adapted to be moved by the first movable member, indicating mechanism operated by said second movable member, a friction-brake to engage and hold said second member in the position to which it is turned, means for releasing said brake, and a spring to return said second member to its normal position when the brake is released.

11. In a striking-machine, the combination with a movable member adapted to be actuated by a blow, an operating-lever pivoted on the casing and adapted to be turned on its pivot by said movable member, indicating mechanism actuated by said operating-lever, a curved brake-bar pivoted to the casing at one end, a spring attached to the brake-bar at its opposite end to hold said bar in frictional contact with the operating-lever, and a lever to move the brake-bar to release the operating-lever.

12. In a striking-machine, the combination with a casing, of a longitudinally-movable shaft mounted in bearings on said casing, a buffer secured to the forward end of said shaft, a spring to resist the longitudinal movement of said shaft, a stud on the casing, an operating-lever pivoted at one end on said stud, an arm pivoted on said stud and provided with laterally-extending arms at one end and a gear-segment at its upper end, a coiled spring secured at one end to one of said lateral arms and at its opposite end to the operating-lever, a stop on one of the laterally-extending arms to engage the operating-lever, a spring to hold the operating-arm in its normal forward position, an air-compression cylinder pivoted at one end to the casing and having its piston-rod pivotally attached to the other laterally-extending arm, a dial secured to the casing, a shaft having one end extending in the axis of the dial, an indicating-hand on said shaft, a stub-shaft on the casing, a pinion on said stub-shaft engaging the gear-segment, and bevel-gears to transmit motion from said stub-shaft to the shaft to which the indicator-hand is secured.

In testimony whereof I affix my signature in presence of two witnesses.

AUGUSTE ARTHUR CAILLE.

Witnesses:
 T. E. O'BRIEN,
 ELSIE W. WOODCOCK.